(12) United States Patent
Lauterbach et al.

(10) Patent No.: US 8,072,460 B2
(45) Date of Patent: Dec. 6, 2011

(54) SYSTEM, METHOD, AND COMPUTER PROGRAM PRODUCT FOR GENERATING A RAY TRACING DATA STRUCTURE UTILIZING A PARALLEL PROCESSOR ARCHITECTURE

(75) Inventors: Christian Lauterbach, Carrboro, NC (US); David Patrick Luebke, Charlottesville, VA (US); Michael J. Garland, Lake Elmo, MN (US)

(73) Assignee: NVIDIA Corporation, Santa Clara, CA (US)

( * ) Notice: Subject to any disclaimer, the term of this patent is extended or adjusted under 35 U.S.C. 154(b) by 885 days.

(21) Appl. No.: 11/874,093

(22) Filed: Oct. 17, 2007

(65) Prior Publication Data

US 2009/0106530 A1 Apr. 23, 2009

(51) Int. Cl.
*G06F 15/80* (2006.01)
*G06F 15/00* (2006.01)
*G06T 1/00* (2006.01)

(52) U.S. Cl. ........................ 345/505; 345/501
(58) Field of Classification Search .................. 345/501, 345/502, 505, 519
See application file for complete search history.

(56) References Cited

U.S. PATENT DOCUMENTS

| | | | | | |
|---|---|---|---|---|---|
| 5,684,968 | A | * | 11/1997 | Flurry | 715/806 |
| 5,757,385 | A | * | 5/1998 | Narayanaswami et al. | 345/505 |
| 7,012,604 | B1 | | 3/2006 | Christie et al. | 345/426 |
| 2004/0098566 | A1 | * | 5/2004 | Farrell et al. | 712/214 |
| 2004/0223003 | A1 | * | 11/2004 | Heirich et al. | 345/629 |
| 2005/0017971 | A1 | * | 1/2005 | Ard | 345/423 |
| 2005/0038979 | A1 | * | 2/2005 | Fischer et al. | 712/214 |
| 2008/0079731 | A1 | * | 4/2008 | Shearer | 345/473 |
| 2008/0088622 | A1 | * | 4/2008 | Shearer | 345/421 |
| 2008/0158236 | A1 | * | 7/2008 | Bakalash et al. | 345/506 |

FOREIGN PATENT DOCUMENTS

| | | |
|---|---|---|
| WO | 2006/034034 A3 | 3/2006 |
| WO | 2008/012199 A2 | 1/2008 |

OTHER PUBLICATIONS

European Office Action Summary from application No. GB0818585.2 issued on Feb. 16, 2010.
European Office Action Summary from application No. GB0818585.2 issued on Mar. 6, 2009.
C. Lauterbach et al., "Fast BVH Construction on GPUs". The Eurographics Association and Blackwell Publishing Ltd. 2009; vol. 28, No. 2.
Wald, "On fast Construction of SAH-based Bounding Volume Hierarchies," Proc. IEEE/EG Symposium on Interactive Ray Tracing 2007, Sep. 10-12, 2007.
Examination Report from UK Patent Application No. GB0818585.2, dated Aug. 11, 2010.

* cited by examiner

*Primary Examiner* — Kee M Tung
*Assistant Examiner* — Jacinta M Crawford
(74) *Attorney, Agent, or Firm* — Zilka-Kotab, PC

(57) ABSTRACT

A system, method, and computer program product are provided for generating a ray tracing data structure utilizing a parallel processor architecture. In operation, a global set of data is received. Additionally, a data structure is generated utilizing a parallel processor architecture including a plurality of processors. Such data structure is adapted for use in performing ray tracing utilizing the parallel processor architecture, and is generated by allocating the global set of data among the processors such that results of processing of at least one of the processors is processed by another one of the processors.

22 Claims, 7 Drawing Sheets

SYSTEM, METHOD, AND COMPUTER PROGRAM PRODUCT FOR GENERATING A RAY TRACING DATA STRUCTURE UTILIZING A PARALLEL PROCESSOR ARCHITECTURE

FIELD OF THE INVENTION

The present invention relates to ray tracing, and more particularly to performing ray tracing utilizing a parallel processor architecture.

BACKGROUND

Ray tracing involves a technique for determining a visibility of an object or objects from a given point, such as, but not limited to an "eye" or "camera" point, by following a ray. While such technique theoretically can involve testing a vast number of rays against each and every primitive, this is typically not practical. Instead, designers have used various data structures to identify a subset of such primitives to be involved in the testing, thereby reducing required processing. Examples of such data structures include, but are not limited to a bounding volume hierarchy data structure, scene-graphs, etc.

To date, such data structures have typically been generated utilizing a central processing unit (CPU) or the like. However, any attempt to generate such data structures utilizing a parallel processor architecture (e.g. a graphics processor, etc.) has been problematic. There is thus a need for addressing these and/or other issues associated with the prior art.

SUMMARY

A system, method, and computer program product are provided for generating a ray tracing data structure utilizing a parallel processor architecture. In operation, a global set of data is received. Additionally, a data structure is generated utilizing a parallel processor architecture including a plurality of processors. Such data structure is adapted for use in performing ray tracing utilizing the parallel processor architecture, and is generated by allocating the global set of data among the processors such that results of processing of at least one of the processors is processed by another one of the processors.

DETAILED DESCRIPTION

Figure 1:
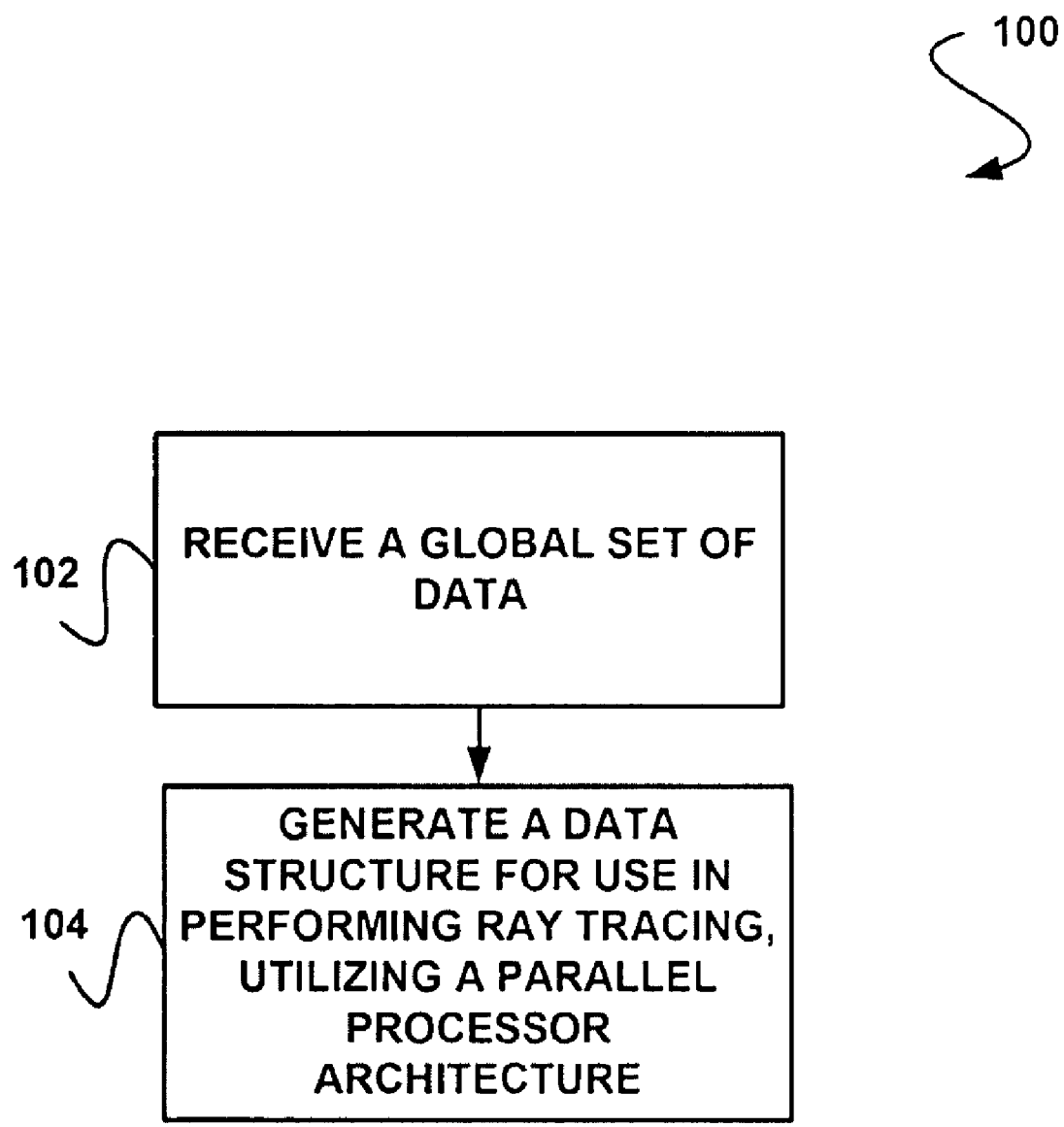
FIG. 1 shows a method for generating a ray tracing data structure utilizing a parallel processor architecture, in accordance with one embodiment.

FIG. 1 shows a method 100 for generating a ray tracing data Structure utilizing a parallel processor architecture, in accordance with one embodiment. As shown, a global set of data is received. See operation 102.

In the context of the present description, a global set of data refers to any data from which a data structure may be generated, as will soon become apparent. For example, in various embodiments, the global set of data may include, but is not limited to information related to a scene, a portion of a scene (e.g. one or more objects therein, etc.), and/or any other data that meets the above definition. In one embodiment, the global set of data may, for example, include one or more primitives (e.g. points, lines or line segments, planes, circles, spheres, triangles or other polygons, spheres, cubes, toroids, pyramids, and/or any other shape, etc.).

Further, a data structure is generated utilizing a parallel processor architecture including a plurality of processors. See operation 104. Such data structure is adapted for use in performing ray tracing utilizing the parallel processor architecture. Further, the data structure is generated by allocating the global set of data among the processors such that results of processing of at least one of the processors is processed by another one of the processors. Such data structure may, in one optional embodiment, include a bounding volume hierarchy (BVH) data structure, but, of course, other types of data structures are contemplated for carrying out the above functionality. By this design, such data structure may be more effectively generated utilizing the parallel processor architecture.

In the context of the present description, the parallel processor architecture may include any architecture that includes two or more processors that operate in parallel. In one embodiment, such parallel processor architecture may take the form of a graphics processor [e.g. graphics processing unit (GPU), etc.], or any other integrated circuit equipped with graphics processing capabilities (e.g. in the form of a chipset, system-on-chip (SOC), core integrated with a CPU, discrete processor, etc.). In still another embodiment, the foregoing parallel processing architecture may include a cell processor.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
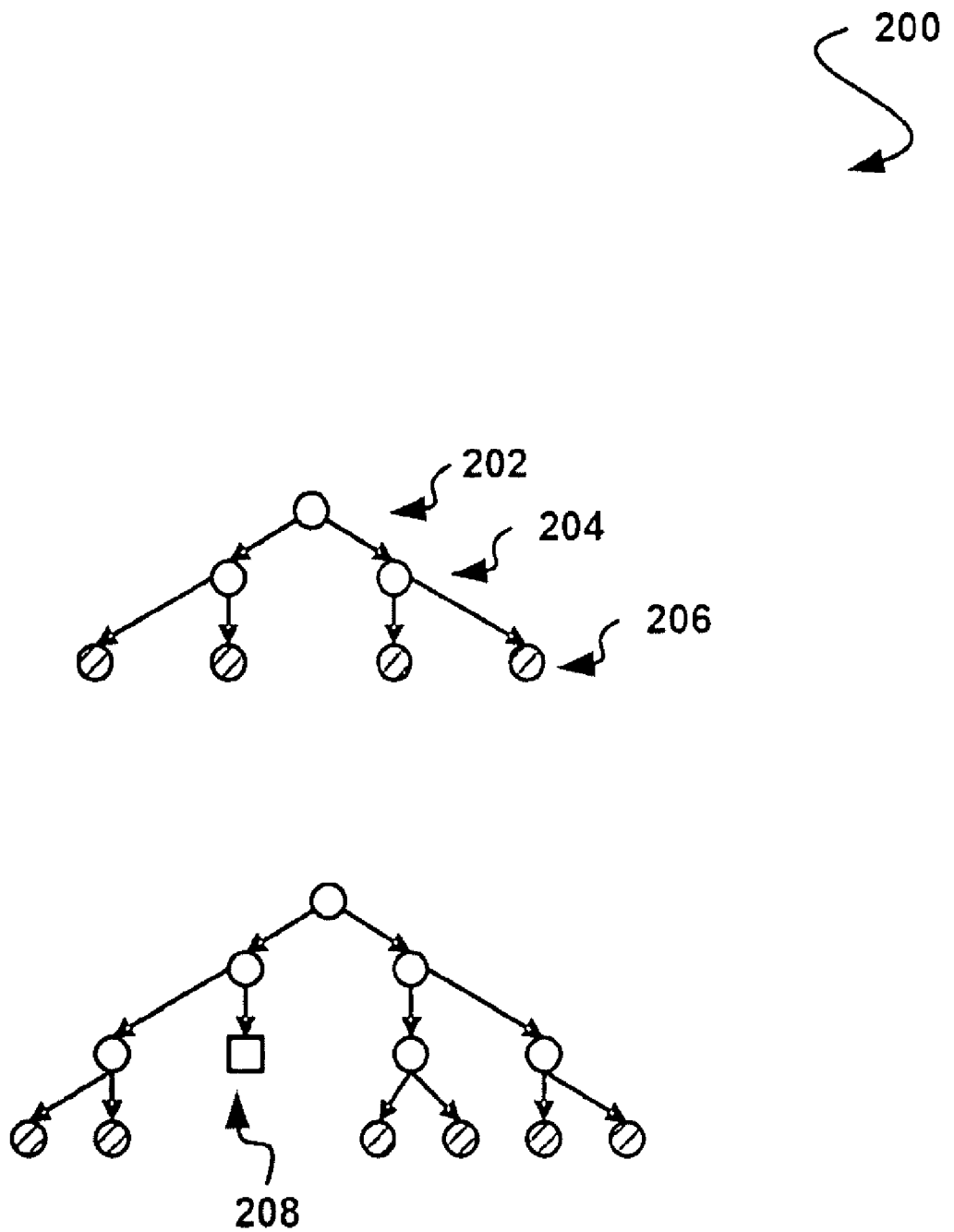
FIG. 2 shows a ray tracing data structure generated utilizing a parallel processor architecture, in accordance with one embodiment.

FIG. 2 shows a ray tracing data structure 200 generated utilizing it parallel processor architecture, in accordance with one embodiment. As an option, the ray tracing data structure 200 may be implemented in the context of the details of FIG. 1. Of course, however, the ray tracing data structure 200 may be implemented in any desired environment. It should also be noted that the aforementioned definitions may apply during the present description.

As shown, the ray tracing data structure 200 conceptually includes a hierarchical data structure. A node 202 is illustrated to be split into two additional nodes 204. The two additional nodes 204 may each be split into two nodes, resulting in four additional nodes 206. Likewise, each of the four additional nodes 206 may be split into two nodes.

In the context of the present description, the node 202 may represent one example of a global set of data. For example, the node 202 may represent a scene which includes a plurality of primitives. As mentioned earlier, the ray tracing data structure 200 may, in one embodiment, include a BVH data structure. In the context of the present description, a BVH refers to a data tree of bounding volumes (e.g. spheres, axis-aligned bounding boxes, and/or oriented bounding boxes, etc.).

At the top of the data tree, a bounded volume (e.g. node 202) may include a large set of data (e.g. a global set of data). At the bottom of the data tree (e.g. at nodes 206), a bounded volume may include a smaller set of data (e.g. up to a predefined number k of primitives). In this case, the size of the bounding volume may be determined by a threshold. For example, a threshold may determine that three primitives per bounding box are sufficient. Of course, such sample threshold is set forth for exemplary purposes only, and should not be construed as limiting in any manner.

This top-down construction of ray tracing hierarchies may allow for parallelization of concurrent split operations between processors of a parallel processor architecture. For example, the split from the first node 202 may be allocated to two processors such that the processors may run in parallel. Because the splits deal with disjoint regions of the ray tracing data structure 200, work/processor subdivision does not necessarily introduce significant synchronization problems.

In the context of the present description, a split refers to a division of data. For example, if the node 202 represents a global set of data, or a global list of primitives, a split of the node 202 may represent a split of the global set of data or the global list of primitives such that each split (e.g. the child nodes or the additional nodes 204) may be allocated to a separate parallel processor.

Thus, a global work queue may be maintained and divided between processors, where each work queue element (e.g. a work item) is one split of a node that may be defined as a subsequence of a global list of primitives (e.g. data corresponding to the node 202). In this case, each node in the data structure, or tree, may correspond to a work item, where a lowest level of the tree (e.g. the nodes 206) may correspond to active work items or data splits. In the context of the present description, a global work queue may refer to a work list, or operations/splits to be performed on corresponding data.

As a result of a split operation, each processor may either produce two new splits, or determine not to split a particular node. When no split is produced for a node, a leaf node 208 may be created in the ray tracing data structure 200. This allows for bounding a total size of the global work queue. In one embodiment, a maximum number of elements in the global work queue may be twice the number of input work items at a particular step.

In a possible embodiment, the BVH may be stored as a flat array of 32-byte nodes. In this case, each node may store a corresponding bounding volume as well as a reference point to a first child. Using the reference pointer to the first child, it may be assumed that a second child is stored after the first child. In another embodiment, a reference pointer to both the first and the second child may be stored in the node.

It should be noted that, in the case of n primitives and one primitive per leaf, a data tree may have 2n−1 nodes. Thus, a size of a list or work queue may be allocated in advance. Of course, the number of primitives per leaf is not limited to one, as any threshold of primitives may be utilized.

Maintaining the global work queue after each parallel split operation by all processors may be performed by a compaction operation. Such compaction operation may eliminate empty work queue entries and determine how many active elements are left to process. In one embodiment, the compaction may be implemented using an efficient parallel scan algorithm. In another embodiment, the compaction may be implemented using atomic hardware instructions with a queue pointer.

In still another embodiment, the compaction may be implemented using indirect addressing of the splits via a table such that each split finds an input split through the table. Using a table may allow the compaction to be performed without reordering the list of splits inside the compaction.

Figure 3:
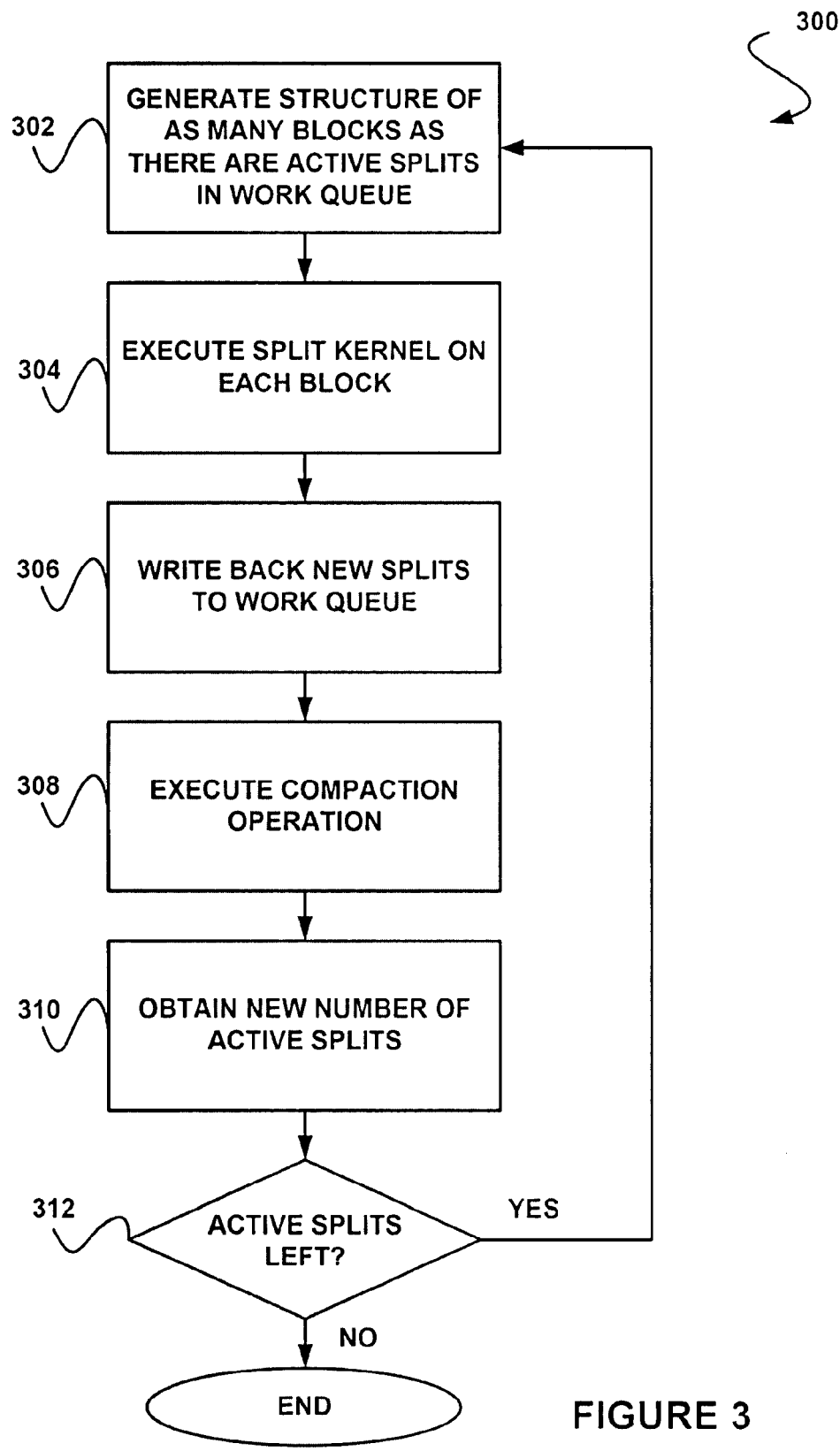
FIG. 3 shows a method for generating a ray tracing data structure utilizing a parallel processor architecture, in accordance with another embodiment.

FIG. 3 shows a method 300 for generating a ray tracing data structure utilizing a parallel processor architecture, in accordance with another embodiment. As an option, the method 300 may be implemented in the context of the details of FIGS. 1-2. For example, the method 300 may be used to generate the ray tracing data structure 200 of FIG. 2. Of course, however, the method 300 may be implemented in any desired environment. It should also be noted that the aforementioned definitions may apply during the present description.

As shown, a structure is generated including as many blocks as there are active splits in a work queue. See operation 302. In the context of the present description, a structure may be any structure that includes blocks which represent splits in a global set of data. In this case, the blocks may indicate work items which are included ion a work queue. Further, the stricture may allocate each block, or work item to one of a plurality of parallel processors of a parallel processor architecture, for example.

Once the structure of blocks or work items has been generated, a split kernel is executed on each block. See operation 304. For example, each block that is determined to be split, may be split into two additional blocks. It should be noted that the split kernel may be executed on each appropriate block. In use, each processor may apply the split kernel to its corresponding block or work item in parallel. More information regarding one exemplary way operation 304 may be carried out will be described in the context of a different embodiment illustrated in FIG. 5.

Once the split kernel is executed, any new splits are written to the work queue. See operation 306. For example, if a block is split, the two additional blocks may be written to the work queue. If the block is not split, no new splits will be written to the work queue.

In one embodiment, each block may map to two locations in the work queue. In this case, a first split block may map to a first and second position, or element, in the work queue. Likewise, a second block may map to a third and fourth position in the work queue.

In the case that the second block is not split, the third and fourth position in the work queue may be retained, without the addition of split data. In this case, the third and fourth position may include data (or lack thereof) indicating that a split has not occurred.

Once the new splits are written to the work queue, a compaction operation is executed. See operation 308. In one example, a first split block may be written to a first and a second position in the work queue, and a second block, which is not split, may map to a third and fourth position in the work queue (which are retained without split data), and a third block, which is split, may be mapped and written to a fifth and sixth position in the work queue. In such case, the compaction operation may be executed to compact the split data. When the compaction operation in executed, the first and second positions in the work queue will be occupied with split data from the first block, and the third and fourth positions in the work queue will be occupied by the split data from the third block, and so on.

Once the compaction operation has been performed, a new number of active splits may then be obtained. See operation 310. For example, it may be determined whether to split each block in the work queue (e.g. the first and second position, etc.). It is then determined whether any active splits are left. See operation 312. If it is determined that active splits are left, the process repeats, beginning with operation 302.

As described, the work queue may be updated with work items to be performed, until it is decided that no additional splits are to be performed. It should be noted that any work item (i.e. block or split) in the work queue may be allocated to any of the plurality of parallel processors. As the work queue is updated with work items, the work items may, in turn, be allocated to different processors.

Figure 4:
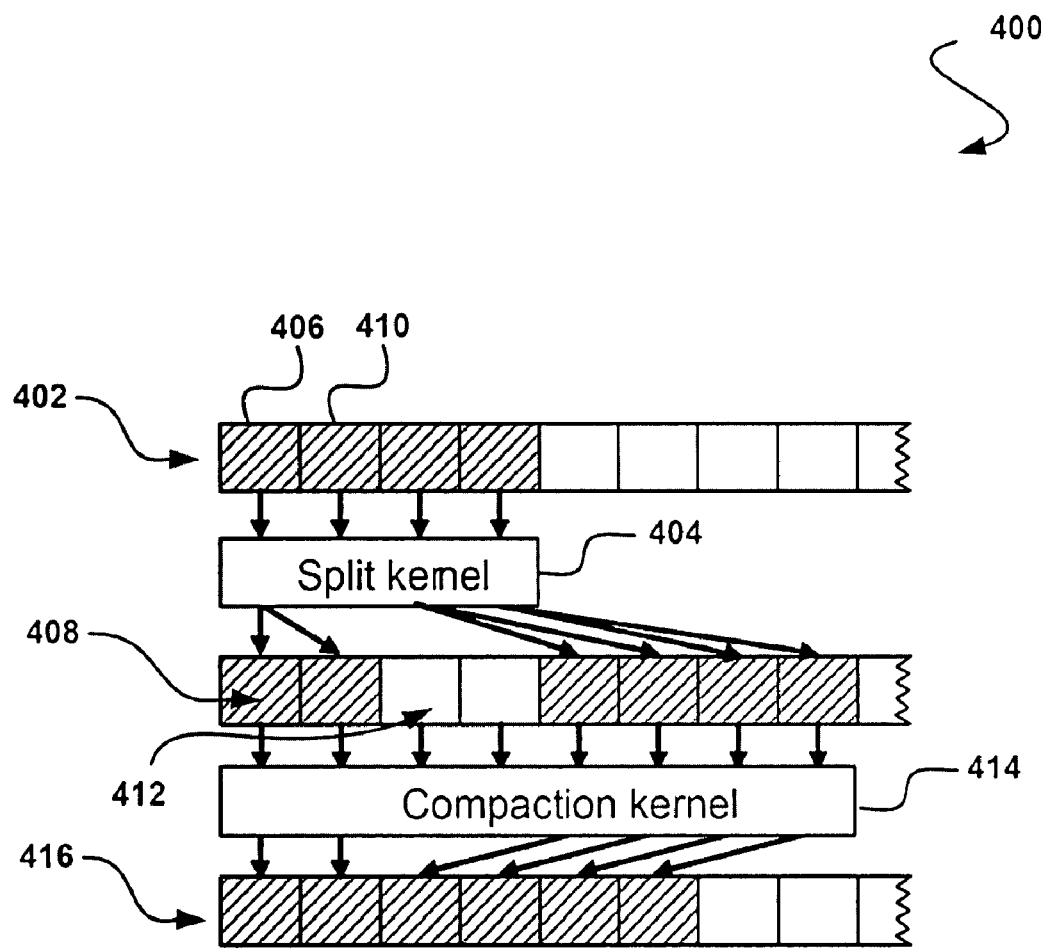
FIG. 4 shows the processing of a work queue for generating a ray tracing data structure in a parallel processor architecture, in accordance with one embodiment.

FIG. 4 shows the processing of a work queue 400 for generating a ray tracing data structure in a parallel processor architecture, in accordance with one embodiment. As an option, the work queue 400 may be processed in the context of the details of FIGS. 1-3. Of course, however, the work queue 400 may be processed in any desired environment. It should also be noted that the aforementioned definitions may apply during the present description.

As shown, a plurality of active splits 402 (i.e. work items) in a work queue 400 are provided. As shown further, a split kernel 404 is executed on each active split 402. Once the split kernel is executed, any new splits may be written to the work queue 400. For example, a first block 406 (i.e. active split) that is determined to be split, may be split into two additional blocks 408.

On the other hand, it may be determined to not split a second block 410. In this case, the second block 410 may map to two positions 412 (e.g. memory locations) in the work queue. In this case, the two positions 412 may include empty entries. In one embodiment, the two positions 412 may include an indicator indicating that a split was not performed on the second block 410.

Once the new splits are written to the work queue 400, a compaction operation may be executed using a compaction kernel 414. As shown, the compaction operation may compact the work queue such that the two positions 412, where a split operation was not performed, are excluded from the compacted work queue 400. Each of the remaining active splits 416 may then be split accordingly using the split kernel 404. This process may be repeated until it is determined that no more splits remain.

It should be noted that the work queue 400 may represent a global set of data. Accordingly, the active splits 402 may represent work items which may include a plurality of primitives. Thus, a data structure may be generated by allocating each work item to a different processor of a parallel processor architecture.

In this case, each of the processors of the parallel processor architecture may split the corresponding work item and, in turn, update the work queue 400. The work items may then be reallocated to the plurality of processors after the compaction has occurred. This process may be repeated for each remaining work item in a work queue (or each node in a data structure). In one embodiment, the allocation of work items to processors may be repeated until each work item includes at most a predefined number of primitives (e.g. 1, 2, 3, etc. primitives). To this end, the data structure may be generated by allocating the global set of data among the processors such that results of processing of at least one of the processors is processed by another one of the processors, and so on.

It should be noted that, because each work item in the work queue 400 may be allocated to a different processor, the number of processors in the parallel processor architecture may correlate to a rate in which the work queue 400 is processed. For example, for sixteen different processors in an architecture, sixteen different work items in the work queue 400 may be processed in parallel. Likewise, for thirty-two different processors in an architecture, thirty-two different work items in the work queue 400 may be processed in parallel.

Thus, a processing rate of the work queue 400 may scale with the number of processors in the parallel processor architecture. In one embodiment, the scaling may be a linear or near linear scaling. For example, doubling the number of processors may double the rate in which the work queue 400 is processed.

Figure 5:
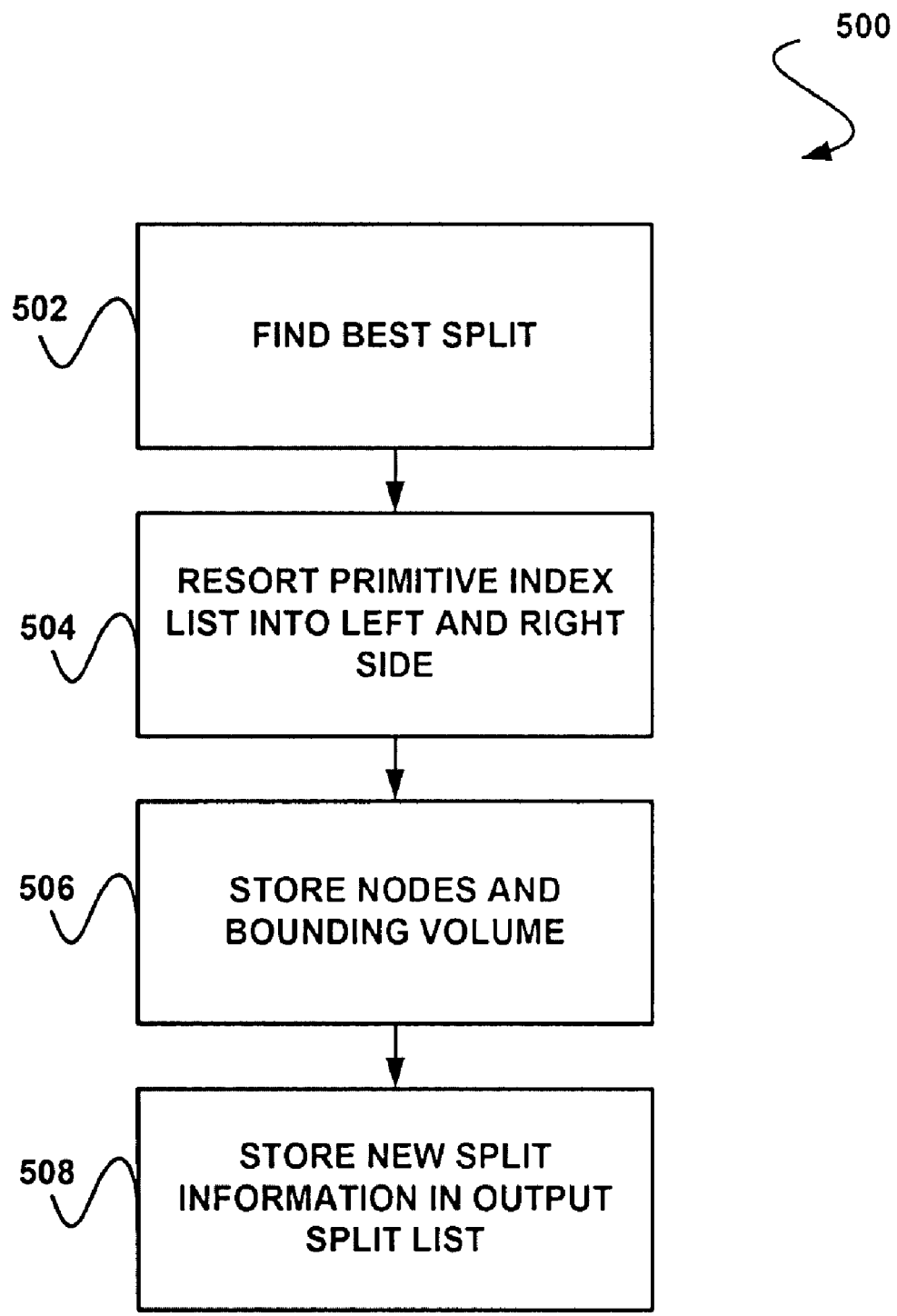
FIG. 5 shows a method for executing a split kernel process when generating a ray tracing data structure utilizing a parallel processor architecture, in accordance with another embodiment.

FIG. 5 shows a method 500 for executing a split kernel process when generating a ray tracing data structure utilizing a parallel processor architecture, in accordance with another embodiment. As an option, the method 500 may be implemented in the context of the details of FIGS. 1-4. For example, in one embodiment, the method 500 may be used to carry out operation 304 of FIG. 3. Of course, however, the method 500 may be implemented in any desired environment. It should also be noted that the aforementioned definitions may apply during, the present description.

As shown, a best split is found for a data set. See operation 502. The data set may include a work item and be represented by a node in a data tree (e.g. see FIG. 2), for example.

In one embodiment, the best split may include a split with a lowest surface area heuristic (SAH) cost. For example, a group of primitives (e.g. a node in a data structure or work item in a work queue) may be split. Each split may be bounded by a bounding volume for each half of the split (e.g. a bounding box, etc.) and a ratio of the weighted sizes of the bounding volumes and the size of the original bounding volume may be calculated. In this case, splits with a lower ratio may correspond to a lower SAH cost.

In one embodiment, a plurality of data sets, or work items, may each be allocated to one of a plurality of processors of a parallel processor architecture. In this case, each processor of the parallel processor architecture may include a plurality of threads for processing the corresponding work item. As an option, the threads may be assigned a plurality of planes to process in parallel. In the context of the present description, a plane refers to an axis-aligned plane that may be used to split a list of objects based on their relative location to the plane (i.e. which side).

In such embodiment, each processor of the parallel processor architecture may split the corresponding work item by selecting one of the planes, based on the processing of the threads. For example, each thread of the processor may select one split position on one axis (e.g. X, Y, or Z) of a work item. Geometry information for the split may then be evaluated in parallel for all threads of the processor. In addition, a SAH metric may be computed for every individual split in parallel.

Furthermore, a bounding volume may also be computed for each split using the individual processor threads. In this case, the bounding volume may be used to bound at least one primitive for each split. Using the bounding volume, a parallel reduction step may find the split with the lowest SAH cost.

This split may then be selected for the work item and the result of the split may be written to a work queue. It should be noted that each work item in a work queue may be allocated to a processor, where multiple threads of the processor may evaluate multiple potential splits of the work item. Thus, each processor may operate on work items in parallel, in addition to each thread of each processor operating on each individual work item in parallel to determine the best split for the corresponding work item.

Once the best split is found, a primitive (e.g. a triangle) index list is resorted into left and right side primitives according to the selected split coordinate access. See operation 504. In other words, the determined split position is used to reorder the primitive list such that the primitives on the left of the split position are on the left side in the list and the primitives on the right side of the split position are on the right side in the list. In one embodiment, this may be performed using a parallel prefix sum operation.

In another embodiment, resorting of the primitives may be performed via a global array of indices. In such case, only the indices may be permuted to avoid memory transfers. In particular, the sort can be performed in-situ.

Once the primitive index list is resorted, nodes and bounding volumes are stored for a left and right child in a BVH. See operation 506. For example, the two nodes resulting from the split of the work item, and their corresponding bounding volumes may be stored.

Furthermore, new split information is stored in an output split list. See operation 508. For example, two new splits, or work items, may be written to a global work queue if it is determined to split a node. On the other hand, work queue elements corresponding to a node may be set to inactive (e.g. a leaf in a BVH data tree), if it is determined that the node is not to be split further.

Figure 6:
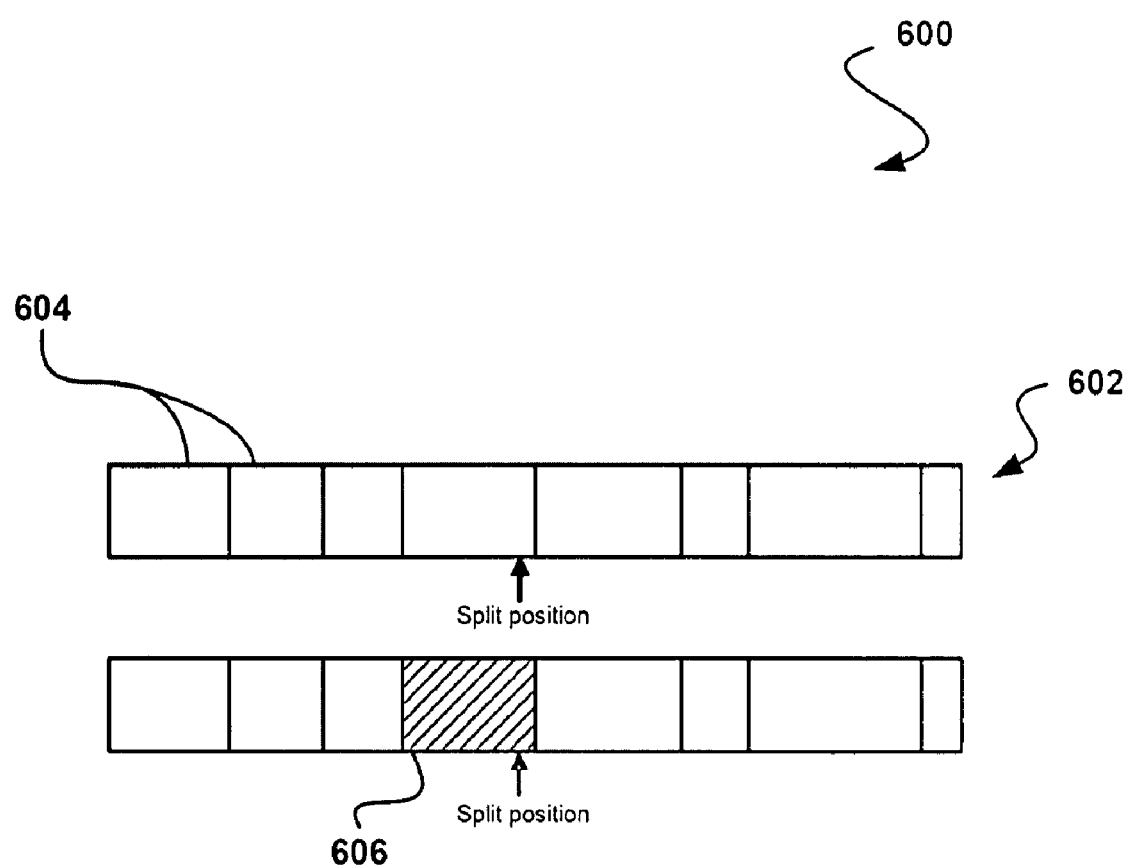
FIG. 6 shows a work item for generating a ray tracing data structure in a parallel processor architecture, in accordance with one embodiment.

FIG. 6 shows a work item 600 for generating a ray tracing data structure in a parallel processor architecture, in accordance with one embodiment. As an option, the work item 600 may be implemented in the context of the details of FIGS. 1-5. Of course, however, the work item 600 may be implemented in any desired environment. It should also be noted that the aforementioned definitions may apply during the present description.

As an option, a work item may be split into a plurality of work item portions. In this case, each work item portion may be allocated to a different processor of the parallel processor architecture. In one embodiment, the number of the work item portions into which the at least one work item is split may based on a number of available processors of the parallel processor architecture. For example, if sixteen processors are available, the work item may be divided into sixteen portions. Of course, various divisions may be appropriate for different systems and/or implementations.

As shown, a work item 600 (e.g. an individual split) including, a list of primitives 602 is provided. The list of primitives 602 for each work item 600 is sorted into a plurality of buckets 604. For example, for each work item 600, a number of blocks, or processors, are assigned which is determined by an ideal number of blocks that should be launched for optimal parallelism. These blocks then perform a regular subdivision into the buckets 604 along each axis of a 3D space that primitives may occupy.

Each block is responsible for one bucket and may stream over the geometry, filtering out those elements whose center points are in the bucket and computing both the count of elements in the bucket and a bounding box for all nodes. Afterwards, one block per split sums up the count of bucket elements, assigning to each an output offset via a parallel prefix sum. Finally, another parallel step per bucket may reorder the primitive indices such that they are sorted by their bucket.

Given the list of primitives 602 for each split, the rest of the splits may be performed by one block per split. In one embodiment, an exact split algorithm may be performed. In this case, the buckets may be used to increase processing speed of both a SAH optimization and any reordering.

Furthermore, given the list of buckets for the split, the reordering step for the split may only consider the elements in an area 606 because the elements in all other buckets are on a correct side of the list of primitives 602. Similarly, a SAH cost calculation may be used because all elements outside of a current bucket may be determined from data stored for each bucket.

In another embodiment, an approximate split may be performed. In this case, the buckets may be used without regard to the primitives. For example, it may be assumed that possible split positions may only be located at bucket boundaries. While this means that the best split location (according to the SAH metric) may not be found, the deviation may be minimal.

On the other hand, the SAH metric may test m−1 split locations for m number of buckets. Furthermore, the bucket bounding boxes and counts may exclusively be used for the calculation. It should be noted that, in this example, reordering may be omitted.

Figure 7:
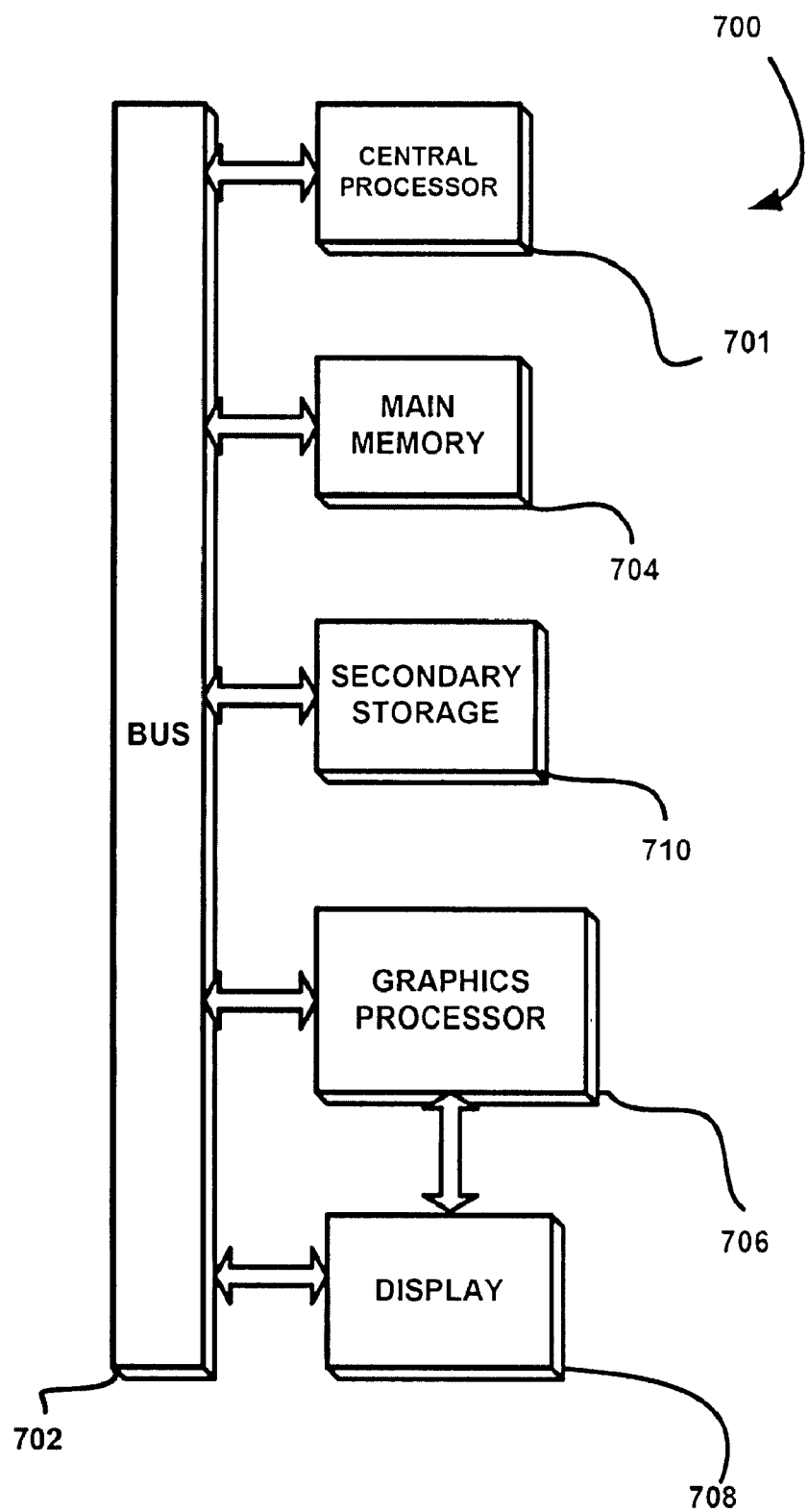
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. In one embodiment, the host processor 701 may represent a plurality of processors. In this case, each of the processors may include a plurality of threads. As an option, each of the processors may run in parallel as a parallel processor architecture. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In one embodiment, the graphics processor 706 may represent a plurality of processors. In this case, each of the processors may include a plurality of threads. As an option, each of the processors may run in parallel as a parallel processor architecture.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, lap-top computer, and/or any other type of logic. Still yet, the system 700 may take the form of various other devices including, but not limited to, a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a global set of data; and
   generating a data structure utilizing a parallel processor architecture including a plurality of processors, the data structure for use in performing ray tracing utilizing the parallel processor architecture, the data structure being generated by allocating the global set of data among the processors such that results of processing of at least one of the processors is processed by another one of the processors;
   wherein the global set of data includes a plurality of work items, and the data structure is generated by allocating each work item of the global set of data to a different processor of the parallel processor architecture;
   wherein each of the processors of the parallel processor architecture splits one or more of its corresponding work items;
   wherein the split work items are written to a work queue and compacted within the work queue, where the compacting includes a compaction operation that eliminates empty work queue entries and determines how many active elements are left to process.

2. The method of claim 1, wherein the parallel processor architecture includes a graphics processor.

3. The method of claim 2, wherein the graphics processor includes a graphics processing unit.

4. The method of claim 1, wherein the plurality of work items each include a plurality of primitives.

5. The method of claim 4, wherein one or more of the work items is split into a plurality of work item portions.

6. The method of claim 5, and further comprising allocating each work item portion to a different processor of the parallel processor architecture.

7. The method of claim 5, wherein a number of the work item portions into which the one or more of the work items is split is based on a number of available processors of the parallel processor architecture.

8. The method of claim 1, wherein the allocation is repeated, after the compaction.

9. The method of claim 1, wherein the allocation is repeated for each of a plurality of nodes of a hierarchy.

10. The method of claim 1, wherein the allocation is repeated until each work item includes at most a predefined number of primitives.

11. The method of claim 1, wherein each processor of the parallel processor architecture includes a plurality of threads for processing the one or more of its corresponding work items.

12. The method of claim 11, wherein the threads are assigned a plurality of planes to process in parallel.

13. The method of claim 12, wherein each processor of the parallel processor architecture splits the one or more of its corresponding work items by selecting one of the planes, based on the processing.

14. The method of claim 1, wherein the data structure includes a bounding volume hierarchy data structure.

15. The method of claim 1, wherein each work item of the corresponding work items includes a primitive list and a position of the split is used to reorder the primitive list such that primitives on a left side of the split position are on a left side in the primitive list and primitives on a right side of the split position are on a right side in the primitive list.

16. The method of claim 1, wherein the compaction operation is implemented using one of an efficient parallel scan algorithm, at least one atomic hardware instruction with a queue pointer, and an indirect addressing of each split via a table such that each split finds an input split through the table.

17. The method of claim 1, wherein each node in the data structure corresponds to one of the plurality of work items.

18. The method of claim 1, wherein the empty work queue entries correspond to positions where a split operation was not performed.

19. The method of claim 1, wherein the compaction operation is executed using a compaction kernel.

20. A computer program product embodied on a non-transitory computer readable medium, comprising:
    computer code for generating a data structure utilizing a parallel processor architecture including a plurality of processors, the data structure for use in performing ray tracing utilizing the parallel processor architecture, the data structure being generated by allocating a global set of data among the processors such that results of processing of at least one of the processors is processed by another one of the processors;
    wherein the computer code is operable such that the global set of data includes a plurality of work items, and the data structure is generated by allocating each work item of the global set of data to a different processor of the parallel processor architecture;
    wherein each of the processors of the parallel processor architecture splits one or more of its corresponding work items;
    wherein the computer program product is operable such that split work items are written to a work queue and compacted within the work queue, where the compacting includes a compaction operation that eliminates empty work queue entries and determines how many active elements are left to process.

21. An apparatus, comprising:
    a parallel processor architecture including a plurality of processors for generating a data structure for use in performing ray tracing, the data structure being generated by allocating a global set of data among the processors such that results of processing of at least one of the processors is processed by another one of the processors;

wherein the apparatus is operable such that the global set of data includes a plurality of work items, and the data structure is generated by allocating each work item of the global set of data to a different processor of the parallel processor architecture;

wherein each of the processors of the parallel processor architecture splits one or more of its corresponding work items;

wherein the apparatus is operable such that split work items are written to a work queue and compacted within the work queue, where the compacting includes a compaction operation that eliminates empty work queue entries and determines how many active elements are left to process.

22. The apparatus of claim 21, wherein the parallel processor architecture is in communication with memory via a bus.

* * * * *